US012581143B2

(12) United States Patent
Zheng

(10) Patent No.: US 12,581,143 B2
(45) Date of Patent: Mar. 17, 2026

(54) VIDEO STREAM DATA ACQUISITION METHOD AND APPARATUS, AND ELECTRONIC DEVICE AND COMPUTER-READABLE MEDIUM

(71) Applicants:Beijing Wodong Tianjun Information Technology Co., Ltd., Beijing (CN); Beijing Jingdong Century Trading Co., Ltd., Beijing (CN)

(72) Inventor: Hongyang Zheng, Beijing (CN)

(73) Assignees: Beijing Wodong Tianjun Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 11 days.

(21) Appl. No.: 18/845,253

(22) PCT Filed: Feb. 21, 2023

(86) PCT No.: PCT/CN2023/077326
§ 371 (c)(1),
(2) Date: Sep. 9, 2024

(87) PCT Pub. No.: WO2023/169202
PCT Pub. Date: Sep. 14, 2023

(65) Prior Publication Data
US 2025/0193466 A1 Jun. 12, 2025

(30) Foreign Application Priority Data
Mar. 11, 2022 (CN) .......................... 202210238230.6

(51) Int. Cl.
H04N 21/236 (2011.01)
H04N 21/2381 (2011.01)
H04N 21/647 (2011.01)

(52) U.S. Cl.
CPC ... *H04N 21/23605* (2013.01); *H04N 21/2381* (2013.01); *H04N 21/64784* (2013.01)

(58) Field of Classification Search
CPC ......... H04N 21/23605; H04N 21/2381; H04N 21/64784
See application file for complete search history.

(56) References Cited

U.S. PATENT DOCUMENTS

| | | | |
|---|---|---|---|
| 2020/0244753 A1* | 7/2020 | Wang | H04L 65/612 |
| 2021/0005068 A1 | 1/2021 | Balasubramanian et al. | |

FOREIGN PATENT DOCUMENTS

| | | |
|---|---|---|
| CN | 105389219 A | 3/2016 |
| CN | 106161431 A | 11/2016 |

(Continued)

OTHER PUBLICATIONS

International Search Report issued in PCT/CN2023/077326, mailed Jun. 19, 2023.

(Continued)

*Primary Examiner* — Yassin Alata
(74) *Attorney, Agent, or Firm* — ICE MILLER LLP; Justin D. Swindells

(57) ABSTRACT

Disclosed are a video stream data acquisition method and apparatus. An implementation of the method includes: determining, in response to receiving a stream pulling data packet from a target terminal, whether a machine room identifier of a communication machine room that receives the stream pulling data packet is the same as a target machine room identifier included in the stream pulling data packet, where the stream pulling data packet is generated during the target terminal's playing of a video stream, and the target machine room identifier is a machine room identifier of a communication machine room that receives a first stream pulling data packet first generated when the target terminal is playing the video stream; if not, forwarding the stream pulling data (Continued)

packet to a target communication machine room correspond-
ing to the target machine room identifier; and acquiring
video stream data through the target communication
machine room.

17 Claims, 4 Drawing Sheets

(56)                    References Cited

FOREIGN PATENT DOCUMENTS

| | | | |
|---|---|---|---|
| CN | 107635010 | A | 1/2018 |
| CN | 111800462 | A | 10/2020 |
| CN | 112068972 | A | 12/2020 |
| CN | 112202833 | A | 1/2021 |
| CN | 112766945 | A | 5/2021 |
| JP | 2017120526 | A | 7/2017 |
| JP | 2020507255 | A | 3/2020 |
| KR | 20140126955 | A | 11/2014 |

OTHER PUBLICATIONS

Notice of Allowance issued in corresponding Japan Application No.
2024-551962 mailed Jul. 8, 2025.

* cited by examiner

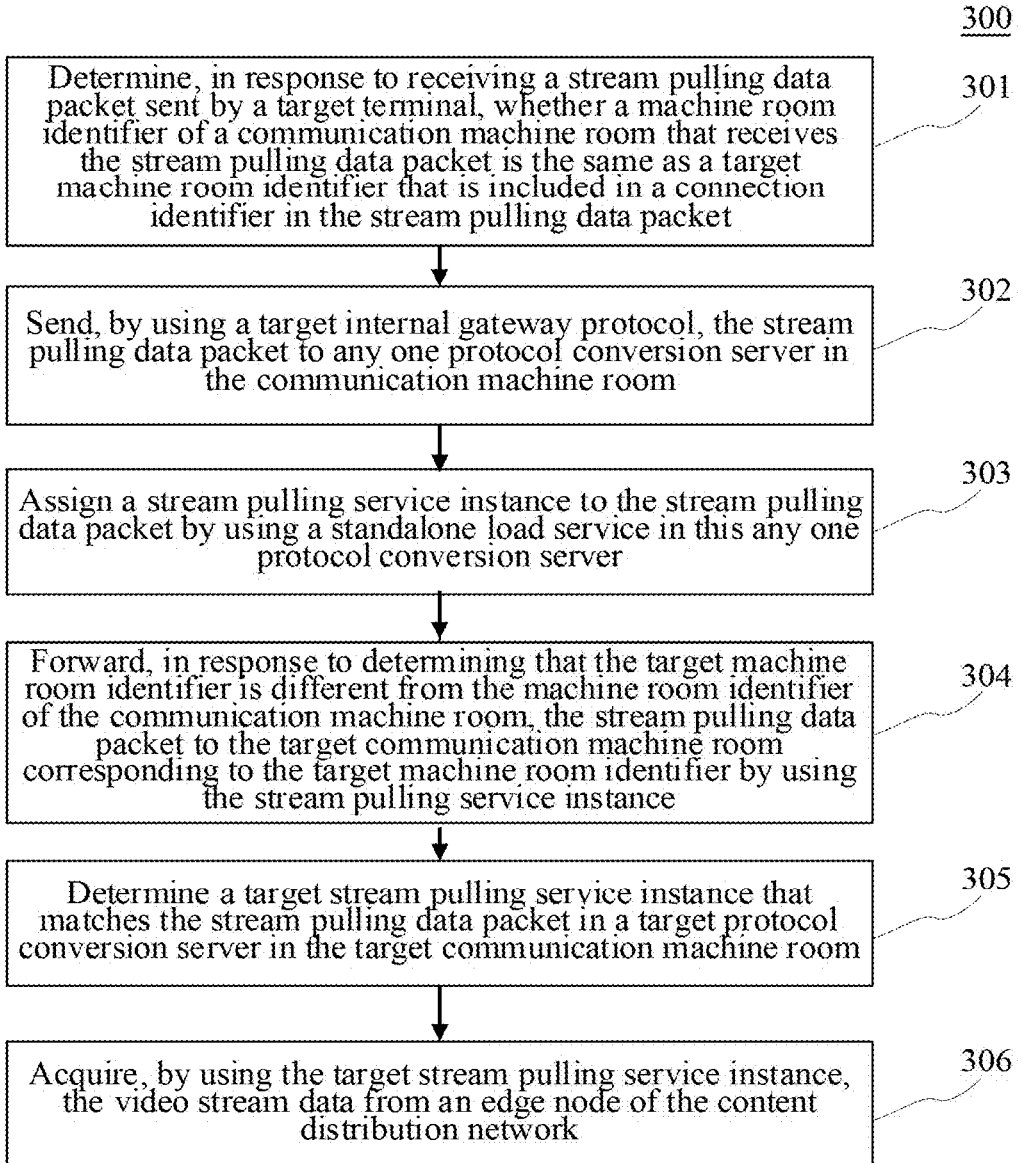

300

Determine, in response to receiving a stream pulling data packet sent by a target terminal, whether a machine room identifier of a communication machine room that receives the stream pulling data packet is the same as a target machine room identifier that is included in a connection identifier in the stream pulling data packet

301

Send, by using a target internal gateway protocol, the stream pulling data packet to any one protocol conversion server in the communication machine room

302

Assign a stream pulling service instance to the stream pulling data packet by using a standalone load service in this any one protocol conversion server

303

Forward, in response to determining that the target machine room identifier is different from the machine room identifier of the communication machine room, the stream pulling data packet to the target communication machine room corresponding to the target machine room identifier by using the stream pulling service instance

304

Determine a target stream pulling service instance that matches the stream pulling data packet in a target protocol conversion server in the target communication machine room

305

Acquire, by using the target stream pulling service instance, the video stream data from an edge node of the content distribution network

VIDEO STREAM DATA ACQUISITION METHOD AND APPARATUS, AND ELECTRONIC DEVICE AND COMPUTER-READABLE MEDIUM

CROSS-REFERENCE TO RELATED APPLICATIONS

The present patent application is a national stage of International Application No. PCT/CN2023/077326, filed on Feb. 21, 2023, which claims priority to Chinese Patent Application No. 202210238230.6, filed before the China National Intellectual Property Administration (CNIPA) on Mar. 11, 2022. All of the aforementioned applications are hereby incorporated by reference in their entireties.

TECHNICAL FIELD

Embodiments of the present disclosure relate to the field of computer technology, and in particular, to a method and apparatus for acquiring video stream data, an electronic device, and a computer readable medium.

BACKGROUND

When a user watches a video stream via a mobile terminal, if the network to which the mobile terminal is connected switches between a mobile network and a wireless network, the video stream may be interrupted during the network switching. Therefore, it is necessary to realize perception-less switching through connection migration when network switching occurs. At present, while performing connection migration, a method usually used is to realize connection migration by adding a seven-layer load-balanced gateway and a four-layer gateway between the mobile terminal and a stream pulling service cluster.

SUMMARY

Content portion of the present disclosure is used to introduce ideas in a brief form, which will be described in detail later in the DETAILED DESCRIPTION OF EMBODIMENTS portion. The content portion of the present disclosure is not intended to identify key features or necessary features of the technical solution claimed, nor is it intended to be used to limit the scope of the technical solution claimed.

Some embodiments of the present disclosure propose a method and apparatus for acquiring video stream data, an electronic device, and a computer readable medium, to solve the technical problem mentioned in the above background section.

In a first aspect, some embodiments of the present disclosure provide a method for acquiring video stream data, the method includes: determining, in response to receiving a stream pulling data packet sent by a target terminal, whether a machine room identifier of a communication machine room that receives the stream pulling data packet is the same as a target machine room identifier comprised in a connection identifier included in the stream pulling data packet, where the stream pulling data packet is generated during the target terminal's playing of a video stream, and the target machine room identifier is a machine room identifier of a communication machine room that receives a first stream pulling data packet first generated when the target terminal is playing the video stream; forwarding, in response to determining that the target machine room identifier is different from the machine room identifier of the communication machine room that receives the stream pulling data packet, the stream pulling data packet to a target communication machine room corresponding to the target machine room identifier; and acquiring video stream data through the target communication machine room.

In a second aspect, some embodiments of the present disclosure provide an apparatus for acquiring video stream data, the apparatus including: a determination unit, configured to determine, in response to receiving a stream pulling data packet sent by a target terminal, whether a machine room identifier of a communication machine room that receives the stream pulling data packet is the same as a target machine room identifier comprised in a connection identifier included in the stream pulling data packet, where the stream pulling data packet is generated during the target terminal's playing of a video stream, and the target machine room identifier is a machine room identifier of a communication machine room that receives a first stream pulling data packet first generated when the target terminal is playing the video stream; a forwarding unit, configured to forward, in response to determining that the target machine room identifier is different from the machine room identifier of the communication machine room that receives the stream pulling data packet, the stream pulling data packet to a target communication machine room corresponding to the target machine room identifier; and an acquisition unit, configured to acquire video stream data through the target communication machine room.

In a third aspect, some embodiments of the present disclosure provide an electronic device, including: at least one processor; a storage apparatus, storing at least one program thereon, the at least one program, when executed by the at least one processor, causes the at least one processor to implement the method described in any one of the implementations in the first aspect.

In a fourth aspect, some embodiments of the present disclosure provide a computer readable medium, storing a computer program thereon, the program, when executed by a processor, implements the method described in any one of the implementations in the first aspect.

BRIEF DESCRIPTION OF THE DRAWINGS

The foregoing and other features, advantages and aspects of embodiments of the present disclosure will become more apparent in conjunction with the accompanying drawings and with reference to the following embodiments. Throughout the accompanying drawings, the same or similar reference numerals indicate the same or similar elements. It should be understood that the accompanying drawings are schematic, and that elements are not necessarily drawn to scale.

FIG. 3 is a flowchart of a method for acquiring video stream data according to some other embodiments of the present disclosure;

DETAILED DESCRIPTION OF EMBODIMENTS

Figure 1:
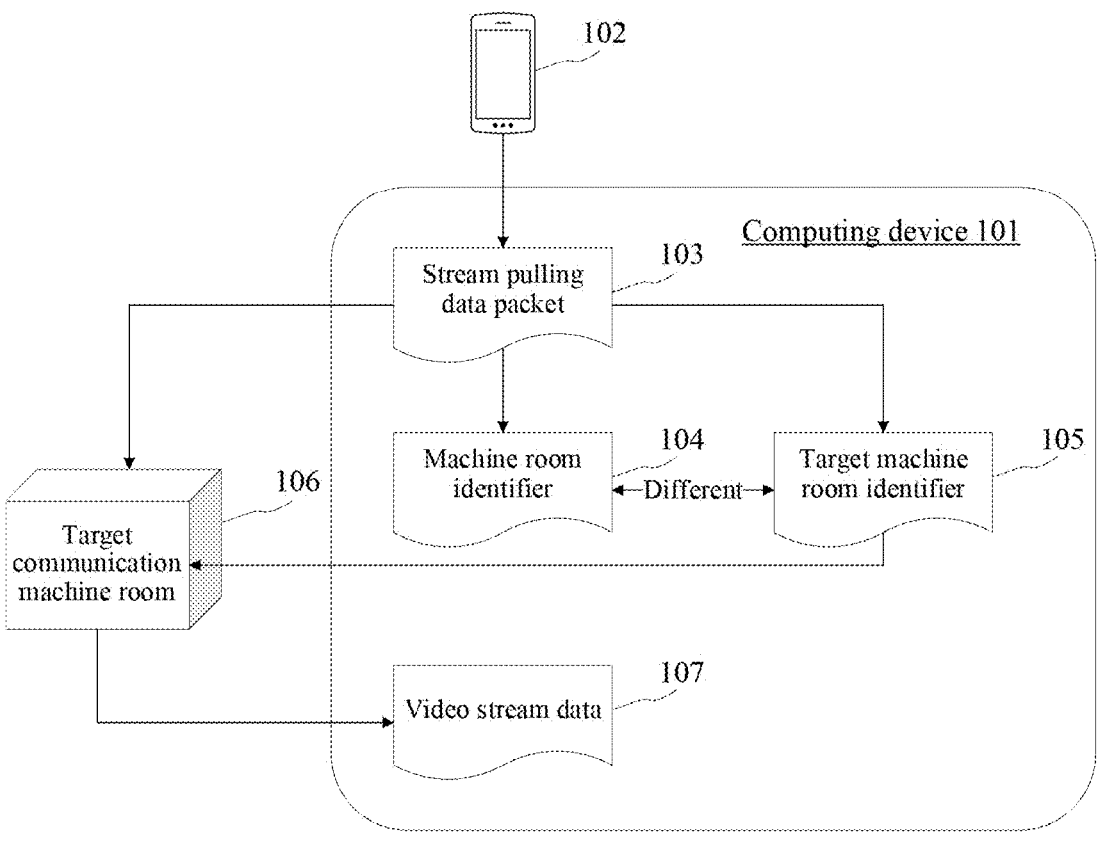
FIG. 1 is a schematic diagram of an application scenario of a method for acquiring video stream data of some embodiments of the present disclosure.

Embodiments of the present disclosure will be further described in detail below in conjunction with the accompanying drawings. Although certain embodiments of the present disclosure are shown in the accompanying drawings, it should be understood, however, that the present disclosure may be implemented in various forms and should not be construed as limited to the embodiments set forth herein. Rather, these embodiments are provided for a more thorough and complete understanding of the present disclosure. It should be understood that the accompanying drawings and embodiments of the present disclosure are provided for exemplary purposes only and are not intended to limit the scope of protection of the present disclosure.

In addition, it should also be noted that, for ease of description, only those parts that are relevant to the relevant disclosure are shown in the accompanying drawings. The embodiments in the present disclosure and the features in the embodiments may be combined with each other on a non-conflict basis.

It should be noted that the concepts of "first" and "second" referred to in embodiments of the present disclosure are only used to distinguish between different apparatuses, modules or units, and are not used to define the order or interdependence of functions performed by these apparatuses, modules or units.

It should be noted that the modifications of "one" and "more than one" referred to in embodiments of the present disclosure are schematic and not limiting, and should be understood by those skilled in the art to mean "at least one" unless the context clearly indicates otherwise.

The names of the messages or information exchanged between the plurality of apparatuses in embodiments of the present disclosure are used for illustrative purposes only and are not intended to be used to limit the scope of those messages or information.

Related methods for acquiring video stream data, for example, to realize connection migration by adding a seven-layer load-balanced gateway and a four-layer gateway between a mobile terminal and a stream pulling service cluster, etc., often suffer from the following technical problems: adding two multi-layer gateways between the mobile terminal and the stream pulling service cluster increases the time it takes for a stream pulling data packet to reach the stream pulling service cluster from the mobile terminal, resulting in a delay of the stream pulling data packet; at the same time, the stream pulling data packet needs to be unpacked twice in total when passing through the two multi-layer gateways, which increases hardware costs and burden on a server.

In order to solve the above problems, some embodiments of the present disclosure propose a method and apparatus for acquiring video stream data, which is capable of avoiding the delay of the stream pulling data packet to a certain extent, and at the same time, the stream pulling data packet does not need to be unpacked several times, which reduces the burden on the server.

Embodiments of the present disclosure will be described in detail below with reference to the accompanying drawings.

FIG. 1 is a schematic diagram of an application scenario of a method for acquiring video stream data of some embodiments of the present disclosure.

In the application scenario of FIG. 1, first, the computing device 101 may determine, in response to receiving a stream pulling data packet 103 which is sent by a target terminal 102, whether a machine room identifier 104 of a communication machine room which receives the stream pulling data packet 103 is the same as a target machine room identifier 105 which is included in connection identifier in the stream pulling data packet 103, where the stream pulling data packet 103 is generated when the target terminal 102 is playing a video stream, and the target machine room identifier 105 is a machine room identifier of a communication machine room which receives the first stream pulling data packet that is first generated when the target terminal 102 is playing the video stream. Then, the computing device 101 may forward, in response to determining that the target machine room identifier 105 is different from the machine room identifier 104 of the communication machine room which receives the stream pulling data packet 103, the stream pulling data packet 103 to a target communication machine room 106 corresponding to the target machine room identifier 105. Finally, the computing device 101 may acquire video stream data 107 through the target communication machine room 106.

It should be noted that the computing device 101 may be hardware or software. When the computing device is hardware, it may be implemented as a distributed server cluster composed of a plurality of servers or terminal devices, or as a single server or terminal device. When the computing device is software, it may be installed in the hardware devices listed above. It may be implemented as, for example, a plurality of software or software modules for providing distributed services, or may be implemented as a single software or software module, which is not limited herein.

It should be understood that the number of computing devices in FIG. 1 is merely illustrative. Depending on the implementation needs, there may be any number of computing devices.

Figure 2:
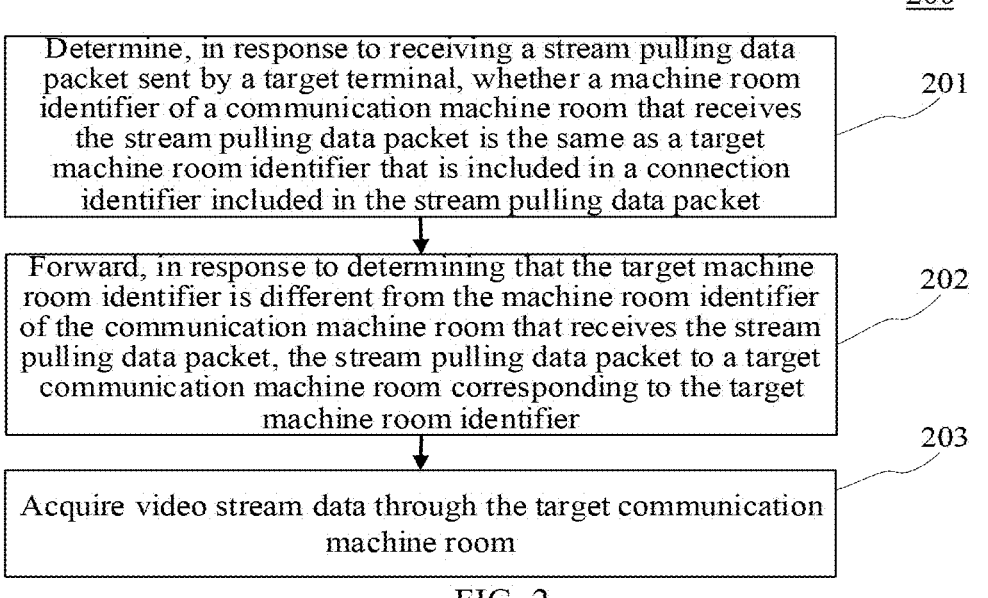
FIG. 2 is a flowchart of a method for acquiring video stream data according to some embodiments of the present disclosure.

With further reference to FIG. 2, a flowchart 200 of a method for acquiring video stream data according to some embodiments of the present disclosure is illustrated. The method for acquiring video stream data, includes the following steps.

Step 201, determining, in response to receiving a stream pulling data packet sent by a target terminal, whether a machine room identifier of a communication machine room that receives the stream pulling data packet is the same as a target machine room identifier that is included in a connection identifier included in the stream pulling data packet.

In some embodiments, an executing body (such as the computing device 101 shown in FIG. 1) of the method for acquiring video stream data may, in response to receiving the stream pulling data packet sent by the target terminal, whether the machine room identifier of the communication machine room that receives the stream pulling data packet is the same as the target machine room identifier which is included in the connection identifier included in the stream pulling data packet. Here, the stream pulling data packet may be generated during the target terminal's playing of a video stream, and the target machine room identifier is a machine room identifier of a communication machine room which receives the first stream pulling data packet, the first stream pulling data packet is first generated during the target terminal's playing of the video stream. The video stream may be a live video stream or an on-demand video stream. The stream pulling data packet may be a QUIC (Quick UDP (User Datagram Protocol) Internet Connection) packet. The target terminal may be a mobile terminal, e.g., a mobile phone, a tablet computer, etc.

The communication machine room which receives the stream pulling data packet may be a communication room corresponding to a network to which the target terminal is connected when sending the stream pulling data packet. The network to which the target terminal is connected during playing the video stream may be a mobile network or a wireless network. The network to which the target terminal is connected during playing the video stream may also be switched between a mobile network and a wireless network.

A communication machine room corresponding to a network, to which the target terminal is currently connected when sending the first stream pulling data packet, may be determined as the target communication machine room. In addition, a communication machine room identifier of the target communication machine room may be written, as a target communication machine room identifier, into a connection identifier in the first stream pulling data packet. In addition, during playing the video stream, the target communication machine room identifier may be written into connection identifiers of subsequently generated stream pulling data packets.

If the machine room identifier of the communication machine room receiving the stream pulling data packet is the same as the target machine room identifier that is included in the connection identifier included in the stream pulling data packet, it indicates that the communication machine room which receives the stream pulling data packet is the same one as the communication machine room which receives the first stream pulling data packet. Accordingly, no connection migration is required, and the video stream data may be acquired directly through the communication machine room which receives the stream pulling data packet.

If the machine room identifier of the communication machine room receiving the stream pulling data packet is different from the target machine room identifier which is included in the connection identifier included in the stream pulling data packet, it indicates that the communication machine room which receives the stream pulling data packet is a different communication machine room from the communication machine room which receives the first stream pulling data packet, that is, the network to which the target terminal is connected is switched between a mobile network and a wireless network during playing the live video stream. Therefore, in order to ensure that the target terminal may continue playing the video stream smoothly when network switching occurs, it is necessary to forward the stream pulling data packet to the target communication machine room by a connection back-to-source operation.

Thus, it may be determined, through the target machine room identifier included in the connection identifier in the stream pulling data packet, whether the communication machine room currently receiving the stream pulling data packet is the target communication machine room. Accordingly, fast routing of the stream pulling data packet may be realized.

As an example, if the network to which the target terminal is connected when sending the stream pulling data packet is a 5G network of Changchun Mobile, the communication machine room receiving the stream pulling data packet may be the machine room of Changchun Mobile.

In some alternative implementations of some embodiments, the target communication machine room may be determined by: determining a communication machine room corresponding to a network, to which the target terminal is connected when the target terminal generates the first stream pulling data packet during playing the video stream, as the target communication machine room.

Thus, the communication machine room corresponding to the network to which the target terminal is connected when generating the first stream pulling data packet may be determined as the target communication machine room. Then, fast routing of the stream pulling data packet may be realized when subsequent network switching occurs.

Step 202, forwarding, in response to determining that the target machine room identifier is different from the machine room identifier of the communication machine room that receives the stream pulling data packet, the stream pulling data packet to a target communication machine room corresponding to the target machine room identifier.

In some embodiments, the executing body may, in response to determining that the target machine room identifier is different from the machine room identifier of the communication machine room that receives the stream pulling data packet, forward the stream pulling data packet to the target communication machine room corresponding to the target machine room identifier.

Step 203, acquiring video stream data through the target communication machine room.

In some embodiments, after forwarding the stream pulling data packet to the target communication machine room, the executing body may acquire the video stream data returned by the target communication machine room.

In some alternative implementations of some embodiments, the executing body may also perform the following steps.

In a first step, sending, by using a target internal gateway protocol, the stream pulling data packet to any one protocol conversion server in the communication machine room. Here, the target internal gateway protocol may be OSPF (Open Shortest Path First). The protocol conversion server may be any QUIC server in a QUIC server cluster. The QUIC server may convert the QUIC protocol to an HTTP (Hyper Text Transfer Protocol) protocol, and after that acquire the video stream data from an edge node of the content distribution network.

Thus, the target internal gateway protocol may be used to send the stream pulling data packet to any one protocol conversion server in the communication machine room via at least one shortest routing path, to accelerate a routing speed of the stream pulling data packet.

In a second step, assigning a stream pulling service instance to the stream pulling data packet by using a standalone load service in this any one protocol conversion server. Here, the standalone load service may be a kernel-level load service of an operating system. For example, nftable.

Accordingly, stress on the server may be reduced through the kernel-level load service of operating system.

In a third step, in response to determining that the target machine room identifier is the same as the machine room identifier of the communication machine room, acquiring the video stream data through the communication machine room by using the stream pulling service instance. Here, the stream pulling service instance may first convert the stream pulling data packet to an HTTP protocol data packet, and then, acquire the video stream data from a CDN (Content Delivery Network) server in the communication machine room.

The above embodiments of the present disclosure have the following beneficial effects: according to the method for acquiring video stream data of some embodiments of the present disclosure, the delay of the stream pulling data packet may be avoided to a certain extent, and at the same time, the stream pulling data packet does not need to be unpacked several times, which reduces the burden on the server. In particular, the reason for the delay of the stream pulling data packet and the heavy burden on the server is: a seven-layer gateway and a four-layer gateway are added between a mobile terminal and a stream pulling service cluster. Based on this, the method for acquiring video stream data of some embodiments of the present disclosure adds a byte to the connection identifier in the stream pulling data packet, for storing target machine room information, and directly forwards the data packet back to the source based on the target machine room information. Thus, there is no need for the seven-layer gateway between the mobile terminal and the stream pulling service cluster, which avoids the delay of the stream pulling data packet to a certain extent, and alleviates the burden on the server, while accelerating the routing speed of the stream pulling data packet.

Referring to FIG. 3, a flowchart 300 of a method for acquiring video stream data according to some other embodiments of the present disclosure is illustrated. The flowchart 300 of the method for acquiring video stream data includes the following steps.

Step 301, determining, in response to receiving a stream pulling data packet sent by a target terminal, whether a machine room identifier of a communication machine room that receives the stream pulling data packet is the same as a target machine room identifier that is included in a connection identifier in the stream pulling data packet.

In some embodiments, the specific implementation and technical effects thereof of step 301 may be referred to step 201 in those embodiments corresponding to FIG. 2, and detailed description thereof will be omitted.

Step 302, sending, by using a target internal gateway protocol, the stream pulling data packet to any one protocol conversion server in the communication machine room.

In some embodiments, the executing body (such as the computing device 101 shown in FIG. 1) of the method for acquiring video stream data may send the stream pulling data packet to any one protocol conversion server in the communication machine room by using the target internal gateway protocol. Here, the target internal gateway protocol may be OSPF. The protocol conversion server may be any QUIC server in a QUIC server cluster. The QUIC server may convert the QUIC protocol to an HTTP protocol, and after that acquire the video stream data from an edge node of the content distribution network.

Thus, the target internal gateway protocol may be used to send the stream pulling data packet to any one protocol conversion server in the communication machine room via at least one shortest routing path, to accelerate the routing speed of the stream pulling data packet.

Step 303, assigning a stream pulling service instance to the stream pulling data packet by using a standalone load service in this any one protocol conversion server.

In some embodiments, the executing body may assign the stream pulling service instance to the stream pulling data packet by using the standalone load service in any one protocol conversion server. Here, the standalone load service may be kernel-level load service of an operating system. For example, nftable. Accordingly, stress on the server may be reduced through the operating system kernel-level load service.

Step 304, forwarding, in response to determining that the target machine room identifier is different from the machine room identifier of the communication machine room, the stream pulling data packet to the target communication machine room corresponding to the target machine room identifier by using the stream pulling service instance.

In some embodiments, the executing body may, in response to determining that the target machine room identifier is different from the machine room identifier of the communication machine room, forward the stream pulling data packet to the target communication machine room corresponding to the target machine room identifier by using the stream pulling service instance.

Thus, the forward-back-to-source function is integrated into the stream pulling service instance, and there is no longer a separate seven-layer load-balanced gateway, reducing data latency. At the same time, single point of failure due to the seven-layer load-balanced gateway is reduced. In addition, since there is no need to deploy the seven-layer load-balanced gateway, costs may be reduced.

Step 305, determining a target stream pulling service instance that matches the stream pulling data packet in a target protocol conversion server in the target communication machine room.

In some embodiments, the executing body may determine the target stream pulling service instance that matches the stream pulling data packet in the target protocol conversion server in the target communication machine room.

The target communication machine room may, after receiving the first stream pulling data packet first generated by the target terminal during playing the video stream, send a protocol conversion server identifier of the protocol conversion server in the target communication machine room that receives the first stream pulling data packet and a stream pulling service instance identifier of the stream pulling service instance assigned to the first stream pulling data packet in the protocol conversion server, to the target terminal, for the target terminal to write the protocol conversion server identifier and the stream pulling service instance identifier into subsequently generated stream pulling data packets. Thus, the executing body may determine the target protocol conversion server and the target stream pulling service instance in the target protocol conversion server, based on the protocol conversion server identifier and the stream pulling service instance identifier included in a stream pulling data packet.

In some alternative implementations of some embodiments, the executing body determining a target stream pulling service instance in a target protocol conversion server in the target communication machine room that matches the stream pulling data packet, may include the following steps.

In a first step, acquiring a mapping table from a cache server of a protocol conversion server cluster in the target communication machine room. Here, the mapping table includes mapping information, and the mapping information includes: a connection identifier, a protocol conversion server identifier, and a stream pulling service instance identifier. Data stored by the cache server may be data shared by the protocol conversion server cluster.

As an example, the cache server may be a Redis server.

In a second step, selecting, from the mapping table, mapping information that includes a connection identifier same as the connection identifier included in the stream pulling data packet as target mapping information.

In a third step, determining a protocol conversion server corresponding to a protocol conversion server identifier in the target mapping information as the target protocol conversion server.

In a fourth step, determining a stream pulling service instance in the target protocol conversion server corresponding to a stream pulling service instance identifier in the target mapping information as the target stream pulling service instance that matches the stream pulling data packet.

Alternatively, the mapping information in the above mapping table is determined by the following steps.

In a first step, determining a connection identifier included in the first stream pulling data packet, a protocol conversion server identifier of the target protocol conversion server, and a stream pulling service instance identifier of the target stream pulling service instance as the mapping information.

In a second step, recording the mapping information into the mapping table in the cache server.

Alternatively, the target protocol conversion server and the target stream pulling service instance may be determined by the following steps.

In a first step, in response to determining that the target communication machine room receives the first stream pulling data packet, selecting a protocol conversion server from a protocol conversion server cluster in the target communication machine room as the target protocol conversion server. Here, the target protocol conversion server may be randomly selected from the protocol conversion server cluster.

In a second step, assigning, by using a standalone load service in the target protocol conversion server, a stream pulling service instance to the first stream pulling data packet, and using the stream pulling service instance as the target stream pulling service instance. Here, a stream pulling service instance may be created for the first stream pulling data packet using the standalone load service.

Figure 4:
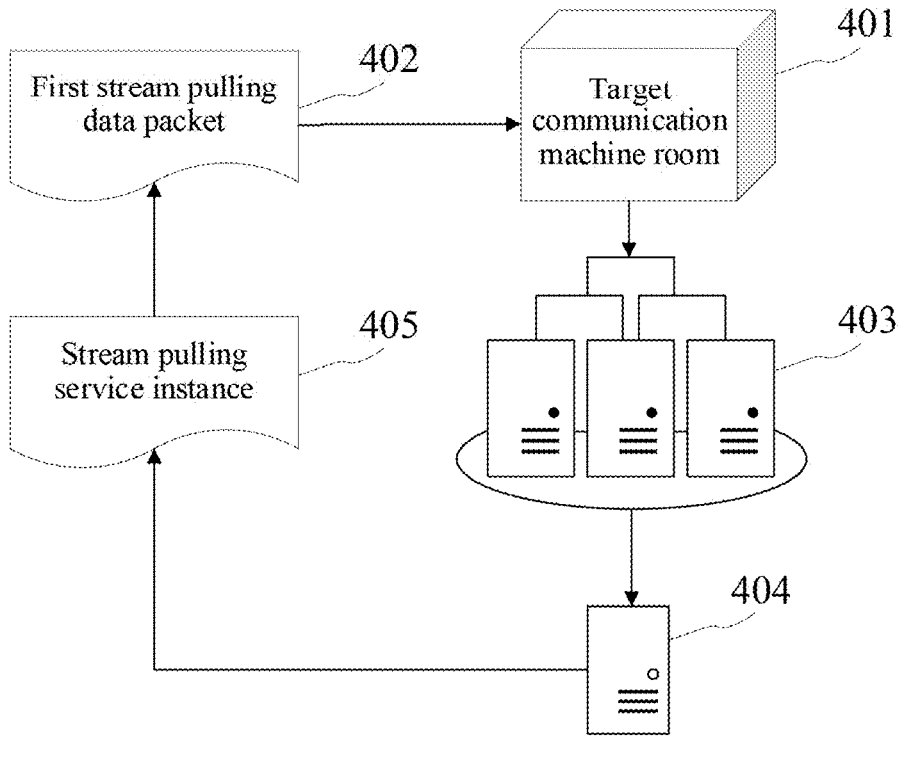
FIG. 4 is a schematic diagram of determining a target stream pulling service instance in a method for acquiring video stream data according to some embodiments of the present disclosure.

As an example, referring to FIG. 4, first, in response to determining that the target communication machine room 401 receives the first stream pulling data packet 402, a protocol conversion server may be selected from the protocol conversion server cluster 403 in the target communication machine room 401 as the target protocol conversion server 404. Then, a standalone load service in the target protocol conversion server 404 may be used to assign a stream pulling service instance 405 to the first stream pulling data packet 402, and the stream pulling service instance may be used as the target stream pulling service instance.

Step 306, acquiring, by using the target stream pulling service instance, the video stream data from an edge node of the content distribution network.

In some embodiments, the executing body may first convert the stream pulling data packet to an HTTP protocol data packet by using the target stream pulling service instance. Then, the executing body may acquire the video stream data from the edge node of the content distribution network in the communication machine room.

In some alternative implementations of some embodiments, the executing body may send the video stream data to the target terminal.

As can be seen in FIG. 3, compared to the description of some embodiments corresponding to FIG. 2, the flowchart 300 of the method for acquiring video stream data in some embodiments corresponding to FIG. 3 embodies detailed steps of forwarding the stream pulling data packet and acquiring the video stream data. Thus, the solution described in these embodiments may accelerate the routing speed of the stream pulling data packet and reduce the stress on the server by using the target internal gateway protocol and the standalone load service.

Figure 5:
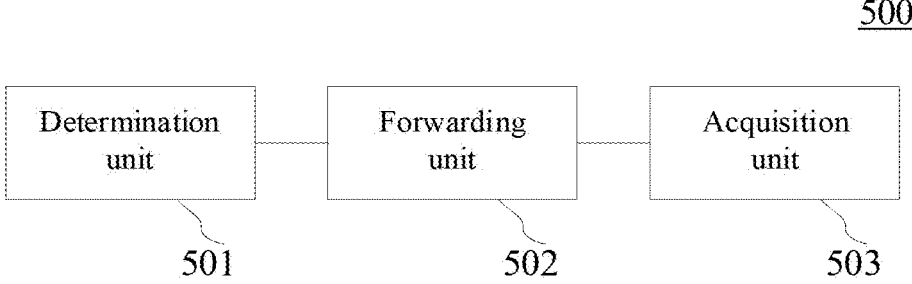
FIG. 5 is a schematic structural diagram of an apparatus for acquiring video stream data according to some embodiments of the present disclosure.

Referring to FIG. 5, as an implementation of the method shown in the above figures, some embodiments of the present disclosure provides an apparatus for acquiring video stream data, and these apparatus embodiments correspond to the method embodiments shown in FIG. 2. The apparatus may be applied to various electronic devices.

As shown in FIG. 5, the apparatus 500 for acquiring video stream data of some embodiments includes: a determination unit 501, a forwarding unit 502 and an acquisition unit 503. The determination unit 501 is configured to determine, in response to receiving a stream pulling data packet sent by a target terminal, whether a machine room identifier of a communication machine room that receives the stream pulling data packet is the same as a target machine room identifier comprised in a connection identifier included in the stream pulling data packet, where the stream pulling data packet is generated during the target terminal's playing of a video stream, and the target machine room identifier is a machine room identifier of a communication machine room that receives a first stream pulling data packet first generated when the target terminal is playing the video stream. The forwarding unit 502 is configured to forward, in response to determining that the target machine room identifier is different from the machine room identifier of the communication machine room that receives the stream pulling data packet, the stream pulling data packet to a target communication machine room corresponding to the target machine room identifier. The acquisition unit 503 is configured to acquire video stream data through the target communication machine room.

In some alternative implementations of some embodiments, the acquisition unit 503 includes a first acquisition subunit and a second acquisition subunit. The first acquisition subunit is configured to determine a target stream pulling service instance that matches the stream pulling data packet in a target protocol conversion server in the target communication machine room. The second acquisition subunit is configured to acquire, by using the target stream pulling service instance, the video stream data from an edge node of a content distribution network.

In some alternative implementations of some embodiments, the target communication machine room is determined by: determining a communication machine room corresponding to a network, to which the target terminal is connected when the target terminal generates the first stream pulling data packet during playing the video stream, as the target communication machine room.

In some alternative implementations of some embodiments, the target protocol conversion server and the target stream pulling service instance are determined by: selecting, in response to determining that the target communication machine room receives the first stream pulling data packet, a protocol conversion server from a protocol conversion server cluster in the target communication machine room as the target protocol conversion server; and assigning, by using a standalone load service in the target protocol conversion server, a stream pulling service instance to the first stream pulling data packet, and using the stream pulling service instance as the target stream pulling service instance.

In some alternative implementations of some embodiments, the first acquisition subunit includes: a mapping table acquisition subunit, a selection subunit, a server determination subunit, and an instance determination subunit. The mapping table acquisition subunit is configured to acquire a mapping table from a cache server of the protocol conversion server cluster in the target communication machine room, where, the mapping table comprises mapping information, and the mapping information comprises: a connection identifier, a protocol conversion server identifier, and a stream pulling service instance identifier. The selection subunit is configured to select, from the mapping table, mapping information that comprises a connection identifier same as the connection identifier included in the stream pulling data packet as target mapping information. The server determination subunit is configured to determine a protocol conversion server corresponding to a protocol conversion server identifier in the target mapping information as the target protocol conversion server. The instance determination subunit is configured to determine a stream pulling service instance in the target protocol conversion server corresponding to a stream pulling service instance identifier in the target mapping information as the target stream pulling service instance that matches the stream pulling data packet.

In some alternative implementations of some embodiments, the mapping information in the mapping table is determined by: determining a connection identifier included in the first stream pulling data packet, a protocol conversion server identifier of the target protocol conversion server, and a stream pulling service instance identifier of the target stream pulling service instance as the mapping information; and recording the mapping information into the mapping table in the cache server.

In some alternative implementations of some embodiments, the forwarding unit 502 includes: a first sending subunit, an assigning subunit, and a forwarding subunit. The first sending subunit is configured to send, by using a target internal gateway protocol, the stream pulling data packet to any one protocol conversion server in the communication machine room. The assigning subunit is configured to assign a stream pulling service instance to the stream pulling data packet by using a standalone load service in the any one protocol conversion server. The forwarding subunit is configured to forward, in response to determining that the target machine room identifier is different from the machine room identifier of the communication machine room, the stream pulling data packet to the target communication machine room corresponding to the target machine room identifier by using the stream pulling service instance.

In some alternative implementations of some embodiments, the apparatus 500 further includes: a sending unit, an assignment unit, and a video stream acquisition unit. The sending unit is configured to send, by using a target internal gateway protocol, the stream pulling data packet to any one protocol conversion server in the communication machine room. The assignment unit is configured to assign a stream pulling service instance to the stream pulling data packet by using a standalone load service in the any one protocol conversion server. The video stream acquisition unit is configured to acquire, in response to determining that the target machine room identifier is the same as the machine room identifier of the communication machine room, the video stream data through the communication machine room by using the stream pulling service instance.

It may be understood that the units recorded in the apparatus 500 correspond to the steps in the method described with reference to FIG. 2. Thus, the operations, features and beneficial effects described above for the method are also applicable to the apparatus 500 and the units contained therein, and detailed description thereof will be omitted.

Figure 6:
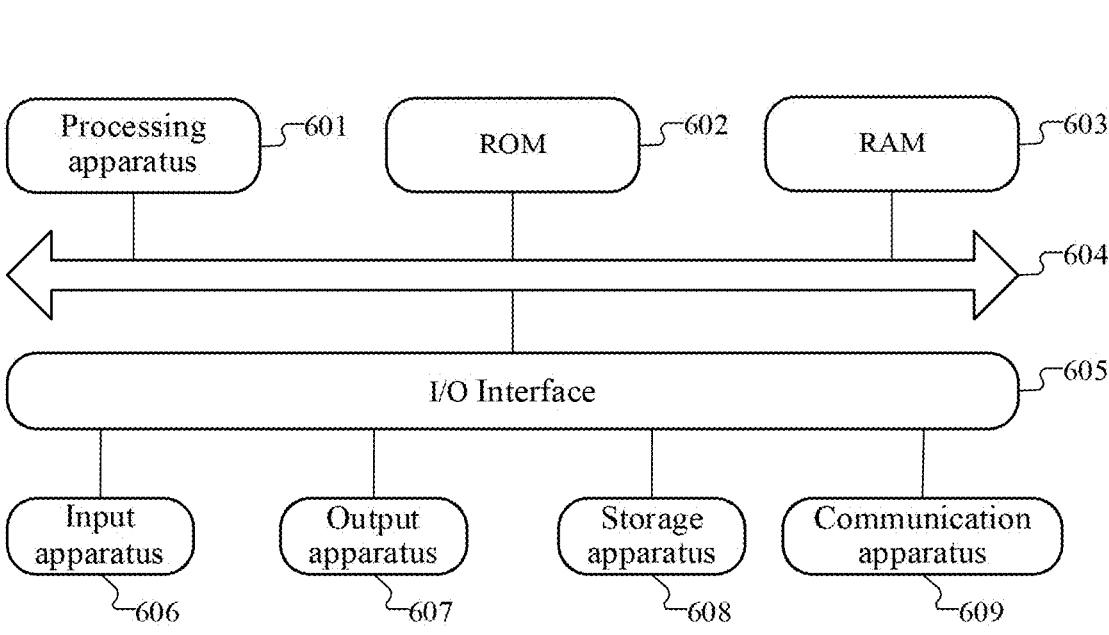
FIG. 6 is a schematic structural diagram of an electronic device suitable for implementing some embodiments of the present disclosure.

Referring next to FIG. 6, a schematic structural diagram of an electronic device 600 suitable for implementing some embodiments of the present disclosure is illustrated. The electronic device illustrated in FIG. 6 is merely an example and should not impose any limitations on the functionality and scope of use of the embodiments of the present disclosure.

As shown in FIG. 6, the electronic device 600 may include a processing apparatus 601 (e.g., a central processing unit or a graphics processing unit), which may execute various appropriate actions and processes in accordance with a program stored in a read only memory (ROM) 602 or a program loaded into a random-access memory (RAM) 603 from a storage apparatus 608. The RAM 603 further stores various programs and data required by operations of the electronic device 600. The processing apparatus 601, the ROM 602, and the RAM 603 are connected to each other through a bus 604. An input/output (I/O) interface 605 is also connected to the bus 604.

In general, the following apparatuses may be connected to the I/O interface 605: an input apparatus 606 including a touch screen, a touch pad, a keyboard, a mouse, a camera, a microphone, an accelerometer, a gyroscope, or the like; an output apparatus 607 including a liquid crystal display device (LCD), a speaker, a vibrator, or the like; and a communication apparatus 609. The communication apparatus 609 may allow the electronic device 600 to exchange data with other devices through wireless or wired communication. While FIG. 6 shows the electronic device 600 having various apparatuses, it should be understood that it is not necessary to implement or provide all of the apparatuses shown in the figure. More or fewer apparatuses may be alternatively implemented or provided. Each block shown in FIG. 6 may represent an apparatus, or represent a plurality of apparatuses as required.

In particular, according to some embodiments of the present disclosure, the process described above with reference to the flowchart may be implemented as a computer software program. For example, some embodiments of the present disclosure include a computer program product, which includes a computer program that is embedded in a computer readable medium. The computer program includes a program code for executing the method as shown in the flowchart. In such some embodiments, the computer program may be downloaded and installed from a network via the communication apparatus 609, or be installed from the storage apparatus 608, or be installed from the ROM 602. The computer program, when executed by the processing apparatus 601, implements the above functions as defined by the method of some embodiments of the present disclosure.

It should be noted that the computer readable medium in embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical/tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

In some implementations, a client end or server may communicate with each other by using any currently known or future developed network Protocol such as HTTP (Hyper-Text Transfer Protocol), and may interact with digital data communication (e.g. communication network) in any form or medium. Examples of communication networks include local area network ("LAN"), wide area network ("WAN"), internets (e.g., the Internet), and end-to-end network (e.g., ad hoc end-to-end network), as well as any currently known or future developed networks.

The computer readable medium may be included in the above electronic device, or a stand-alone computer readable medium not assembled into the electronic device. The computer readable medium carries one or more programs. The one or more programs, when executed by the electronic device, cause the electronic device to: determine, in response to receiving a stream pulling data packet sent by a target terminal, whether a machine room identifier of a communication machine room which receives the stream pulling data packet is the same as a target machine room identifier which is included in connection identifier in the stream pulling data packet, where the stream pulling data packet is generated when the target terminal is playing a video stream, and the target machine room identifier is a machine room identifier of a communication machine room which receives the first stream pulling data packet that is first generated when the target terminal is playing the video stream; forward, in response to determining that the target machine room identifier is different from the machine room identifier of the communication machine room which receives the stream pulling data packet, the stream pulling data packet to a target communication machine room corresponding to the target machine room identifier; and acquire video stream data through the target communication machine room.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flowcharts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units described in some embodiments of the present disclosure may be implemented by means of software or hardware. The described units may also be provided in a processor, for example, may be described as: a processor including a determination unit, a forwarding unit and an acquisition unit. Here, the names of these units do not in some cases constitute limitations to such units themselves. For example, the acquisition unit may also be described as "a unit configured to acquire video stream data".

The functions described above herein may be performed, at least in part, by at least one hardware logic component. For example, non-limitingly, exemplary types of hardware logic components that may be used include: field programmable gate arrays (FPGAs), application-specific integrated circuits (ASICs), application-specific standard products (ASSPs), systems-on-a-chip (SOCs), complex programmable logic devices (CPLDs), or the like.

What is claimed is:

1. A method for acquiring video stream data, the method comprising:

determining, in response to receiving a stream pulling data packet sent by a target terminal, whether a machine room identifier of a communication machine room that receives the stream pulling data packet is the same as a target machine room identifier comprised in a connection identifier included in the stream pulling data packet, wherein the stream pulling data packet is generated during the target terminal's playing of a video stream, and the target machine room identifier is a machine room identifier of a communication machine room that receives a first stream pulling data packet first generated when the target terminal is playing the video stream;

forwarding, in response to determining that the target machine room identifier is different from the machine room identifier of the communication machine room that receives the stream pulling data packet, the stream pulling data packet to a target communication machine room corresponding to the target machine room identifier; and acquiring video stream data through the target communication machine room.

2. The method according to claim 1, wherein the acquiring video stream data through the target communication machine room, comprises:

determining a target stream pulling service instance that matches the stream pulling data packet in a target protocol conversion server in the target communication machine room; and acquiring, by using the target stream pulling service instance, the video stream data from an edge node of a content distribution network.

3. The method according to claim 1, wherein the target communication machine room is determined by:

determining a communication machine room corresponding to a network, to which the target terminal is connected when the target terminal generates the first stream pulling data packet during playing the video stream, as the target communication machine room.

4. The method according to claim 2, wherein the target protocol conversion server and the target stream pulling service instance are determined by:

selecting, in response to determining that the target communication machine room receives the first stream pulling data packet, a protocol conversion server from a protocol conversion server cluster in the target communication machine room as the target protocol conversion server; and assigning, by using a standalone load service in the target protocol conversion server, a stream pulling service instance to the first stream pulling data packet, and using the stream pulling service instance as the target stream pulling service instance.

5. The method according to claim 2, wherein the determining a target stream pulling service instance that matches the stream pulling data packet in a target protocol conversion server in the target communication machine room, comprises:

acquiring a mapping table from a cache server of the protocol conversion server cluster in the target communication machine room, wherein, the mapping table comprises mapping information, and the mapping information comprises: a connection identifier, a protocol conversion server identifier, and a stream pulling service instance identifier;

selecting, from the mapping table, mapping information that comprises a connection identifier same as the connection identifier included in the stream pulling data packet as target mapping information;

determining a protocol conversion server corresponding to a protocol conversion server identifier in the target mapping information as the target protocol conversion server; and determining a stream pulling service instance in the target protocol conversion server corresponding to a stream pulling service instance identifier in the target mapping information as the target stream pulling service instance that matches the stream pulling data packet.

6. The method according to claim 5, wherein the mapping information in the mapping table is determined by:

determining a connection identifier included in the first stream pulling data packet, a protocol conversion server identifier of the target protocol conversion server, and a stream pulling service instance identifier of the target stream pulling service instance as the mapping information; and recording the mapping information into the mapping table in the cache server.

7. The method according to claim 1, wherein the forwarding, in response to determining that the target machine room identifier is different from the machine room identifier of the communication machine room that receives the stream pulling data packet, the stream pulling data packet to a target communication machine room corresponding to the target machine room identifier, comprises:

sending, by using a target internal gateway protocol, the stream pulling data packet to any one protocol conversion server in the communication machine room;

assigning a stream pulling service instance to the stream pulling data packet by using a standalone load service in the any one protocol conversion server; and forwarding, in response to determining that the target machine room identifier is different from the machine room identifier of the communication machine room, the stream pulling data packet to the target communication machine room corresponding to the target machine room identifier by using the stream pulling service instance.

8. The method according to claim 1, wherein the method further comprises:

sending, by using a target internal gateway protocol, the stream pulling data packet to any one protocol conversion server in the communication machine room;

assigning a stream pulling service instance to the stream pulling data packet by using a standalone load service in the any one protocol conversion server; and in response to determining that the target machine room identifier is the same as the machine room identifier of the communication machine room, acquiring the video stream data through the communication machine room by using the stream pulling service instance.

9. An electronic device, comprising:

at least one processor; and a storage apparatus, storing at least one program thereon, wherein, the at least one program, when executed by the at least one processor, causes the at least one processor to implement operations, the operations comprising:

determining, in response to receiving a stream pulling data packet sent by a target terminal, whether a machine room identifier of a communication machine room that receives the stream pulling data packet is the same as a target machine room identifier comprised in a connection identifier included in the stream pulling data packet, wherein the stream pulling data packet is generated during the target terminal's playing of a video stream, and the target machine room identifier is a machine room identifier of a communication machine room that receives a first stream pulling data packet first generated when the target terminal is playing the video stream;

forwarding, in response to determining that the target machine room identifier is different from the machine room identifier of the communication machine room that receives the stream pulling data packet, the stream pulling data packet to a target communication machine room corresponding to the target machine room identifier; and acquiring video stream data through the target communication machine room.

10. The electronic device according to claim 9, wherein the acquiring video stream data through the target communication machine room, comprises:

determining a target stream pulling service instance that matches the stream pulling data packet in a target protocol conversion server in the target communication machine room; and acquiring, by using the target stream pulling service instance, the video stream data from an edge node of a content distribution network.

11. The electronic device according to claim 9, wherein the target communication machine room is determined by:

determining a communication machine room corresponding to a network, to which the target terminal is connected when the target terminal generates the first stream pulling data packet during playing the video stream, as the target communication machine room.

12. The electronic device according to claim 10, wherein the target protocol conversion server and the target stream pulling service instance are determined by:

selecting, in response to determining that the target communication machine room receives the first stream pulling data packet, a protocol conversion server from a protocol conversion server cluster in the target communication machine room as the target protocol conversion server; and assigning, by using a standalone load service in the target protocol conversion server, a stream pulling service instance to the first stream pulling data packet, and using the stream pulling service instance as the target stream pulling service instance.

13. The electronic device according to claim 10, wherein the determining a target stream pulling service instance that matches the stream pulling data packet in a target protocol conversion server in the target communication machine room, comprises:

acquiring a mapping table from a cache server of the protocol conversion server cluster in the target communication machine room, wherein, the mapping table comprises mapping information, and the mapping information comprises: a connection identifier, a protocol conversion server identifier, and a stream pulling service instance identifier;

selecting, from the mapping table, mapping information that comprises a connection identifier same as the connection identifier included in the stream pulling data packet as target mapping information;

determining a protocol conversion server corresponding to a protocol conversion server identifier in the target mapping information as the target protocol conversion server; and determining a stream pulling service instance in the target protocol conversion server corresponding to a stream pulling service instance identifier in the target mapping information as the target stream pulling service instance that matches the stream pulling data packet.

14. The electronic device according to claim 13, wherein the mapping information in the mapping table is determined by:

determining a connection identifier included in the first stream pulling data packet, a protocol conversion server identifier of the target protocol conversion server, and a stream pulling service instance identifier of the target stream pulling service instance as the mapping information; and recording the mapping information into the mapping table in the cache server.

15. The electronic device according to claim 9, wherein the forwarding, in response to determining that the target machine room identifier is different from the machine room identifier of the communication machine room that receives the stream pulling data packet, the stream pulling data packet to a target communication machine room corresponding to the target machine room identifier, comprises:

sending, by using a target internal gateway protocol, the stream pulling data packet to any one protocol conversion server in the communication machine room;

assigning a stream pulling service instance to the stream pulling data packet by using a standalone load service in the any one protocol conversion server; and forwarding, in response to determining that the target machine room identifier is different from the machine room identifier of the communication machine room, the stream pulling data packet to the target communication machine room corresponding to the target machine room identifier by using the stream pulling service instance.

16. The electronic device according to claim 9, wherein the operations further comprise:

sending, by using a target internal gateway protocol, the stream pulling data packet to any one protocol conversion server in the communication machine room;

assigning a stream pulling service instance to the stream pulling data packet by using a standalone load service in the any one protocol conversion server; and in response to determining that the target machine room identifier is the same as the machine room identifier of the communication machine room, acquiring the video stream data through the communication machine room by using the stream pulling service instance.

17. A non-transitory computer readable medium, storing a computer program thereon, wherein, the program, when executed by a processor, implements operations, the operations comprising:

determining, in response to receiving a stream pulling data packet sent by a target terminal, whether a machine room identifier of a communication machine room that receives the stream pulling data packet is the same as a target machine room identifier comprised in a connection identifier included in the stream pulling data packet, wherein the stream pulling data packet is generated during the target terminal's playing of a video stream, and the target machine room identifier is a machine room identifier of a communication machine room that receives a first stream pulling data packet first generated when the target terminal is playing the video stream;

forwarding, in response to determining that the target machine room identifier is different from the machine room identifier of the communication machine room that receives the stream pulling data packet, the stream pulling data packet to a target communication machine room corresponding to the target machine room identifier; and acquiring video stream data through the target communication machine room.

* * * * *